United States Patent [19]

Minagawa et al.

[11] Patent Number: 4,614,239

[45] Date of Patent: Sep. 30, 1986

[54] DRILLER FOR USE IN RICE FIELD

[76] Inventors: Isao Minagawa, No. 7-37, Daibo-cho, Yoshida-machi, Nishi-Kanbara-gun, Niigata-ken; Toshio Minagawa, No. 1253-1, Oaza-Hokkedo, Yoshida-machi, Nishi-Kanbara-gun, Niigata-ken, both of Japan

[21] Appl. No.: 687,873

[22] Filed: Dec. 31, 1984

[30] Foreign Application Priority Data

Apr. 6, 1984 [JP] Japan .................................. 59-69561

[51] Int. Cl.⁴ ........................ A01B 45/02; A01B 35/00
[52] U.S. Cl. ...................................... 172/21; 172/93; 172/47
[58] Field of Search ....................... 172/21, 22, 82, 84, 172/88, 95, 93, 101, 47; 111/89

[56] References Cited

U.S. PATENT DOCUMENTS

| 270,994 | 1/1883 | Springer | 172/101 |
|---|---|---|---|
| 1,871,529 | 8/1932 | Karshner | 111/6 |
| 2,063,333 | 12/1936 | Nolte | 172/22 |
| 2,223,559 | 12/1940 | Fleming | 172/431 |
| 2,800,066 | 7/1957 | Cohrs | 172/93 |
| 3,986,562 | 10/1976 | Killion | 172/22 |

FOREIGN PATENT DOCUMENTS

| 354982 | 6/1922 | Fed. Rep. of Germany | 111/89 |
|---|---|---|---|
| 50020 | 1/1933 | Norway | 111/89 |
| 497277 | 12/1938 | United Kingdom | 172/22 |

*Primary Examiner*—Richard J. Johnson
*Attorney, Agent, or Firm*—Fulbright & Jaworski

[57] ABSTRACT

This driller for use in a rice field comprises attaching a vertically moving supporting frame to a guide frame which is connected with a tractor and is raised and lower by a first vertically movable mechanism; connecting a first transfer mechanism mounted on the guide frame with a second transfer mechanism mounted on the supporting frame by means of an expansion and contraction rod; providing a crank driven by the second transfer mechanism as well as a vertically movable vertical rod, on the supporting frame; connecting the crank with the vertical rod by means of a connecting rod; mounting a movable frame, which is biased forwards continuously by a biasing spring and has vertical drilling rods, on horizontal guide rails disposed at the lower end of the vertical rod; and connecting both ends of a swing lever whose middle part is pivotally supported on the front part of the guide frame to the tractor and the supporting frame respectively.

1 Claim, 5 Drawing Figures

DRILLER FOR USE IN RICE FIELD

BACKGROUND OF THE INVENTION

This invention relates to a driller which can drill a number of holes automatically in a rice field.

In recent years, the tillage work in the rice field has been made by driving various large-sized agricultural implements such as tractor, combined harvester and thresher, and the like in the rice fields. As the result of this, the rice field surface is hardened by the weight of these machines, and thus there is formed a hardened earth layer of even about 20-30 cm in depth. However, since the depth of a layer cultivated by a tractor is only about 10-15 cm, there remains a hardened earth layer of about 10-15 cm in depth under this cultivated layer. The presence of a remaining hardened earth layer like this not only prevents the aquatic rice from spreading its root in the deep portion of the earth layer, but also hinders the performance of the underdrain formed at a place lower about 100 cm than the rice field surface, namely watering and/or draining performance. Due to this, it becomes impossible or difficult to make a planned and organized water control system, which is indispensable for favorable growth of rice plants, such as supply of water, supplement of water, excess water draining and the like, whereby there takes place such a phenomenon that the soil gets worse and the growth of aquatic rice is hindered.

In view of the fact that any effective means to solve the above mentioned phenomenon have not been proposed yet, the inventor of this invention has done various studies to find such means, and has found that it is effective to solve this problem by drilling longitudinal holes having a diameter of about 3 cm and a depth of about 30-60 cm in the rice field, preferably at intervals of about 25-30 cm.

SUMMARY OF THE INVENTION

It is an object of this invention to provide a driller which can be attached to a tractor and drill the aforesaid longitudinal holes in the rice field automatically, without adopting any special operation, as a tractor drives, and further can lift its drilling means above the earth surface so as not to contact therewith when the drilling operation is off.

In order to achieve said object, this invention provides a driller characterized by including a vertically movable guide frame connected with a tractor, through a connecting mechanism; a vertically movable supporting frame attached, to said guide frame; a first vertically movable mechanism driven by a driving source mounted on the tractor for raising and lowering said guide frame; a first transfer mechanism attached to said guide frame and driven by a driving source mounted on the tractor; a second transfer mechanism attached to said supporting frame and connected with said first transfer mechanism by means of an expansion and contraction rod; a vertically movable support, to said supporting frame; a second vertically movable mechanism attached to said supporting frame and driven by the action of the second transfer mechanism for raising and lowering said movable support means; a horizontally movable means provided, at the lower end of said movable support means; a biasing means provided between the lower end of said movable support means and said movable means and designed to bias the movable means constantly toward the running direction of the tractor; drilling means disposed perpendicularly to said mobile means; and a swing lever supported pivotally it its middle part on said guide frame and connected at its one end with the tractor and at its other end with said supporting frame respectively.

It is another object of this invention to provide a driller designed so that on lifting the guide frame above the earth surface when the drilling operation is off, the supporting frame is lifted automatically relative to the gude frame for raising the drilling means more above the earth surface, whereby the movement of the tractor at the time of drilling is free from any hindrance and the drilling means are prevented from being damaged.

The above mentioned object of this invention can be achieved by a preferred embodiment of this invention. That is, the embodiment is designed so that guide frame is provided with a bottom plate on which a first transfer mechanism is mounted and a pair of guide posts disposed on both sides in front of said bottom plate and provided on its outer side with a guide groove; a supporting frame is provided with a vertical rod having a roller rolling in the groove of said guide post, an upper beam connected with the upper end of said vertical rod and extended horizontally, plural pairs of supporting plates disposed longitudinally at regular intervals on said uper beam, a pair among them being provided with a second transfer mechanism, and a lower beam stretched at the lower part of said vertical rod; said roller is disposed in said guide groove; said first transfer mechanism and said second transfer mechanism are connected by means of and expansion and contraction rod to thereby combine both frames; said guide frame is raised and lower by means of a first vertically movable mechanism driven by a driving source mounted on the tractor; a swing lever is pivotally supported at its middle part on said guide frame; and both ends of said swing lever are connected with the rear part of the tractor and said lower beam through a chain respectively. The anticipated object of this invention can be achieved according to this embodiment in such a manner that when the guide frame is raised by means of the first vertically movable mechanism, since the connecting point of one chain with the tractor does not shift in spite of the fact that the pivotsupporting point of the swing lever ascends, one end of the swing lever is pulled by said chain and swung, and the other end thereof raises the lower lever through the other chain, whereby the supporting frame ascends automatically relative to the guide frame.

DETAILED DESCRIPTION OF THE INVENTION

Figure 1:
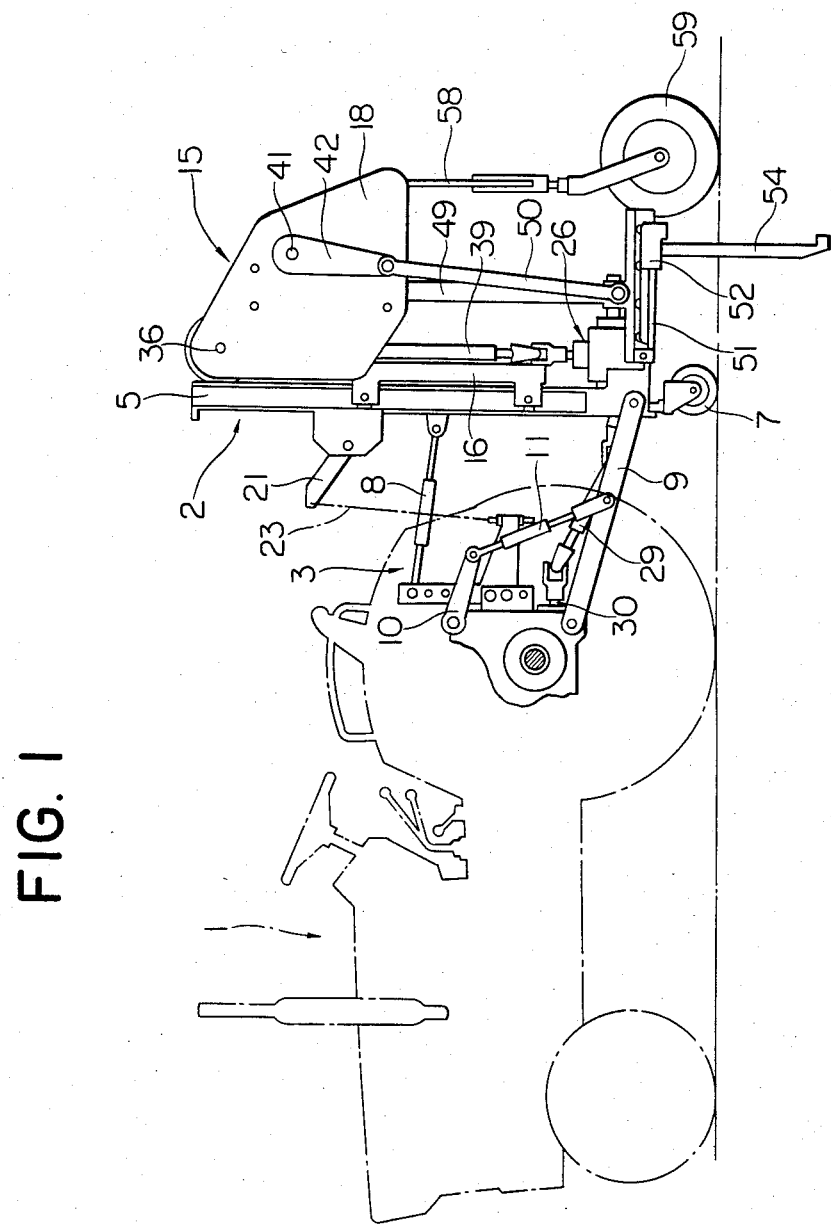
FIG. 1 is an elevational view of one embodiment of the driller for use in rice field according to this invention which is used in connection with the tractor.

Reference numeral 1 denotes a tractor. A guide frame 2 is connected to and vertically movable to this tractor through a connecting mechanism 3. The guide frame 2 is provided with a bottom plate 4 and a pair of guide posts 5 disposed on both sides in front of said bottom plate 4. The guide post 5 is provided at its outer side a guide groove 6. A caster 7 is attached to the back of the bottom plate 4.

The connecting mechanism 3 is provided with an upper link 8 and a lower link 9 whose one end is pivotally supported on the rear part of the tractor 1 respectively. Both links 8, 9 are substantially parallel to each other, and the other end of each link is pivotally supported on the front part of the guide frame 2. On the middle part of the lower link 9 there is pivotally supported the other end of an intermediate link 11 which is pivotally supported on a swing arm 10 and whose one end is connected to a hydraulic motor (not shown). Each of said links 8, 10 is equipped with a turnbuckle. The guide frame 2 is provided, with a vertically movable supporting frame 15. This supporting frame 15 includes a vertical rod 16 parallel to the guide post in the rear thereof, an upper beam 17 connected to the upper end of the vertical rod and extended horizontally, plural pairs (3 pairs in this embodiment) of supporting plates 18, 18' are disposed longitudinally at regular intervals on this upper beam 17, and a lower beam 19 extended between the vertical rods 16 at the lower part thereof. Each vertical rod 16 is provided with a pair of upper and lower rollers 20 which are designed to roll in the grooves 6 of the guide posts 5.

A swing lever 21 is pivotally supported on the front extension of each guide post 5 by means of a pivot pin 22. The front end of said swing lever is connected with the rear part of the tractor by means of a chain 23, and the rear end thereof is connected with the lower beam 19 of the frame 15 by means of a chain 24.

Figure 5:
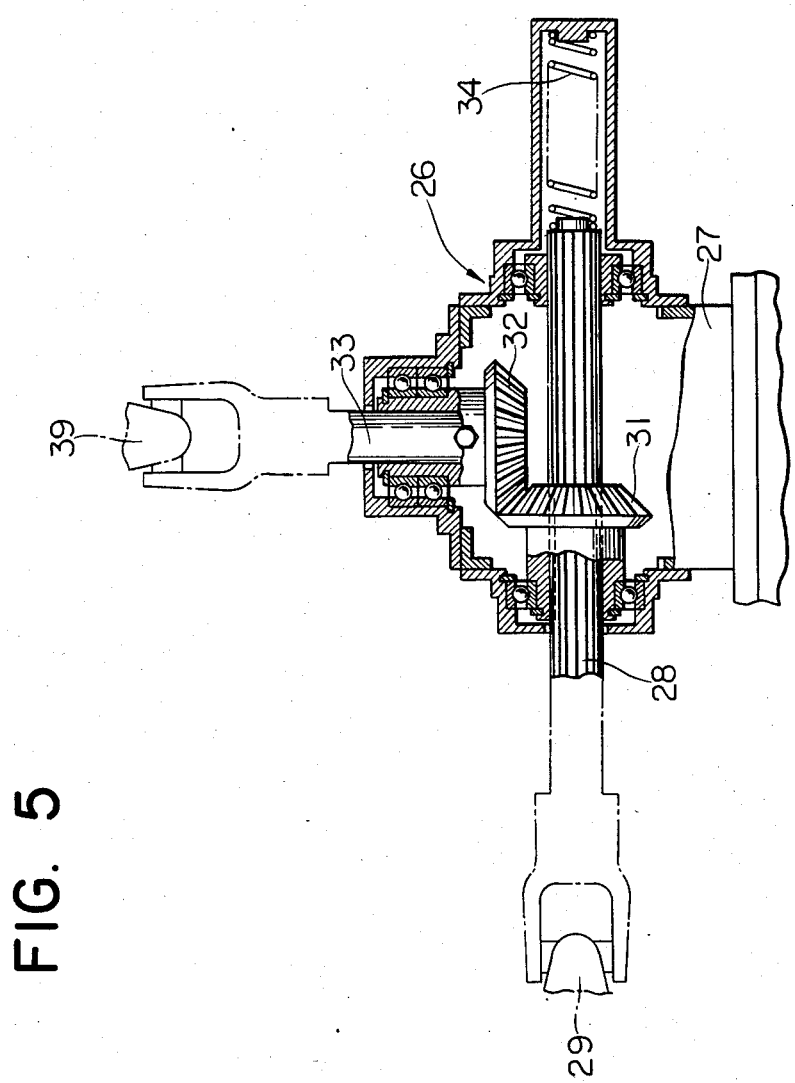
FIG. 5 is a partially cutaway elevational view of the first transfer mechanism illustrated in FIG. 2.

A first transfer mechanism 26 is provided in the rear of the bottom plate 4 of the guide frame 2. This transfer mechanism 26 is illustrated in detail in FIG. 5, wherein a first input shaft with a spline 28 is disposed in a first housing 27 along the advancing direction, the rear part of said shaft is rotatably supported directly on a bearing, and the front part thereof is rotatably supported on a bearing through a shank of a bevel gear 31 spline-engaged with the shaft. To the front end of the input shaft 28 there is connected the rear end of a first expansion and contraction rod 29 through a universal joint. The other end of this expansion and contraction rod 29 is connected to the rear end of a drive shaft projecting from the rear part of the tractor 1 through a universal joint. A spring 34 is received in the projecting part of the housing in the rear of the input shaft 28 so as to bias the input shaft 28 forward continuously. A bevel gear 32, which is disposed perpendicularly to the bevel gear 31 and meshes therewith, is disposed in the housing 27, and there is provided a first output shaft 33 which is connected with said bevel gear 32 and projects out of the housing.

A second output shaft 36 is provided rotatably which penetrates horizontally the upper parts of the whole supporting plates 18 of the supporting frame 15, and a second transfer mechanism 37 is provided at the position opposite to the transfer mechanism 26 of the output shaft 36. The upper end of a second expansion and contraction rod 39 is connected with the lower end of a second input shaft 38, which projects downward from a second housing 35 of this transfer mechanism 37 and is supported rotatably, through a universal joint, and the lower end of this expansion and contraction rod 39 is connected with the upper end of the first output shaft 33 through a universal shaft. The input shaft 38 is provided at the upper end with a bevel gear (not shown), and this bevel gear meshes with a bevel gear (not shown) mounted on the output shaft 36.

A crank shaft 41 is rotatably supported on each pair of supporting plates 18, 18'. Both ends of said shaft project out of the supporting plates 18, 18', and base ends of cranks 42, 42' are fixed on the end parts of the shaft so that cranks 42, 42' may get a different phase angle in the range of 180° to each other. A driving sprocket 43 and a driven sprocket 44 are provided at places opposite to the second output shaft 36 and the crank shaft 41, and a chain 45 is suspended over between both sprockets 43, 44.

A pair of rollers 47, 48 are provided on each of the upper and lower inside surfaces. Between these rollers 47, 48 there is disposed a vertical rod 49 which is designed to roll between these rollers. The lower end of the vertical rod 49 is connected with the front ends of the crank 42, 42' by means of a connecting rod 50. The lower end of the vertical rod 49 is provided with a horizontal guide rails 51. These guide rails 51 are of a I-shaped section and receive a pair of front and rear rollers 53 provided in the inside surfaces of U-shaped movable frames 52, with freedom of rolling, in the grooves formed in both sides of the guide rails. In the bottom surfaces of the movable frames 52 there are perpendicularly provided vertical drilling rods 54 having a diameter of about 3 cm and a length of about 40–70 cm. A tension spring 55 is interposed between the front end of the guide rail 51 and the rear end of the movable frame 52 so as to bias the drilling rod 54 forward constantly. The drilling rod 54 is provided at its lower end with a cylindrical drilling piece 56, and is provided at its front surface with a reinforcing rib 60.

A pair of right and left supporting plates 18, 18' are provided at their lower parts with a horizontal supporting rod 57, and a tail wheel 59 is attached, with freedom of detaching and rolling, to this supporting rod 57 through a supporting leg 58.

When putting the drilling operation in practice using the above mentioned driller, the tractor 1 is driven in the rice field and the drive shaft 30 is rotated. Due to this, the cranks 42, 42' are rotated through the first expansion and contraction rod 29, the first input shaft 28, bevel gears 31, 32, the first output shaft 33, the second expansion and contraction rod 39, the second input shaft 38, the second output shaft 36, the driving sprocket 43, the chain 45, the driven sprocket 44 and the crank shaft 41, whereby right and left rods 49 descend and ascend alternately once per rotation of the cranks 42, 42'. This movement may be done using another working mechanism such as a hydraulic pump, a hydraulic motor or the like in place of the crank mechanism.

When the rods 49 descend, the drilling rods 54 mounted perpendicularly on the movable frames 52 held by the guide rails 51 also descend and are inserted in the soil. During this, the tractor 1 keeps driving. Since the drilling rods 54 remain inserted in the soil even when the tractor 1 is still driving, the drilling rods are held there. And, then the drilling rods move together with the movable frames 52 rearwards relatively against the tension force of the spring 55 and reach the location shown with solid lines in FIG. 2 where the drilling rods 54 stop to descend.

Thereafter, the drilling rods 54 ascend together with the rods 49. During that, however, the aforesaid rearward movement is continued, and upon reaching the location shown with chain lines in FIG. 2, the lower ends of the drilling rods 54 appear above the surface of the earth, and are allowed to restore the original locations, namely said locations shown with chain lines by the tension force of the spring 55. Then, the aforesaid operation is repeated again.

Upon drilling like this, drilling pieces provided at the lower ends of the drilling rods 54 raise the earth when the drilling rods 54 ascend.

Upon effecting the aforesaid drilling operation, there is no possibility of each pair of drilling rods 54 being inserted into the earth at the same time because each pair of drilling rods 54 may get a different phase angle in the range of 180° to each other. Therefore, the reaction force produced at the time of drilling can be reduced by half.

Thus, a predetermined plural holes 63 can be drilled in the rice field, wherein the depth, interval and the like of holes may be established suitably by designing the second up and down mechanism so as to meet the desired conditions. In the above mentioned embodiment, the driller of this invention is attached to the rear portion of the tractor, but may be attached to the front portion or side portion of the tractor if needed.

Figure 2:
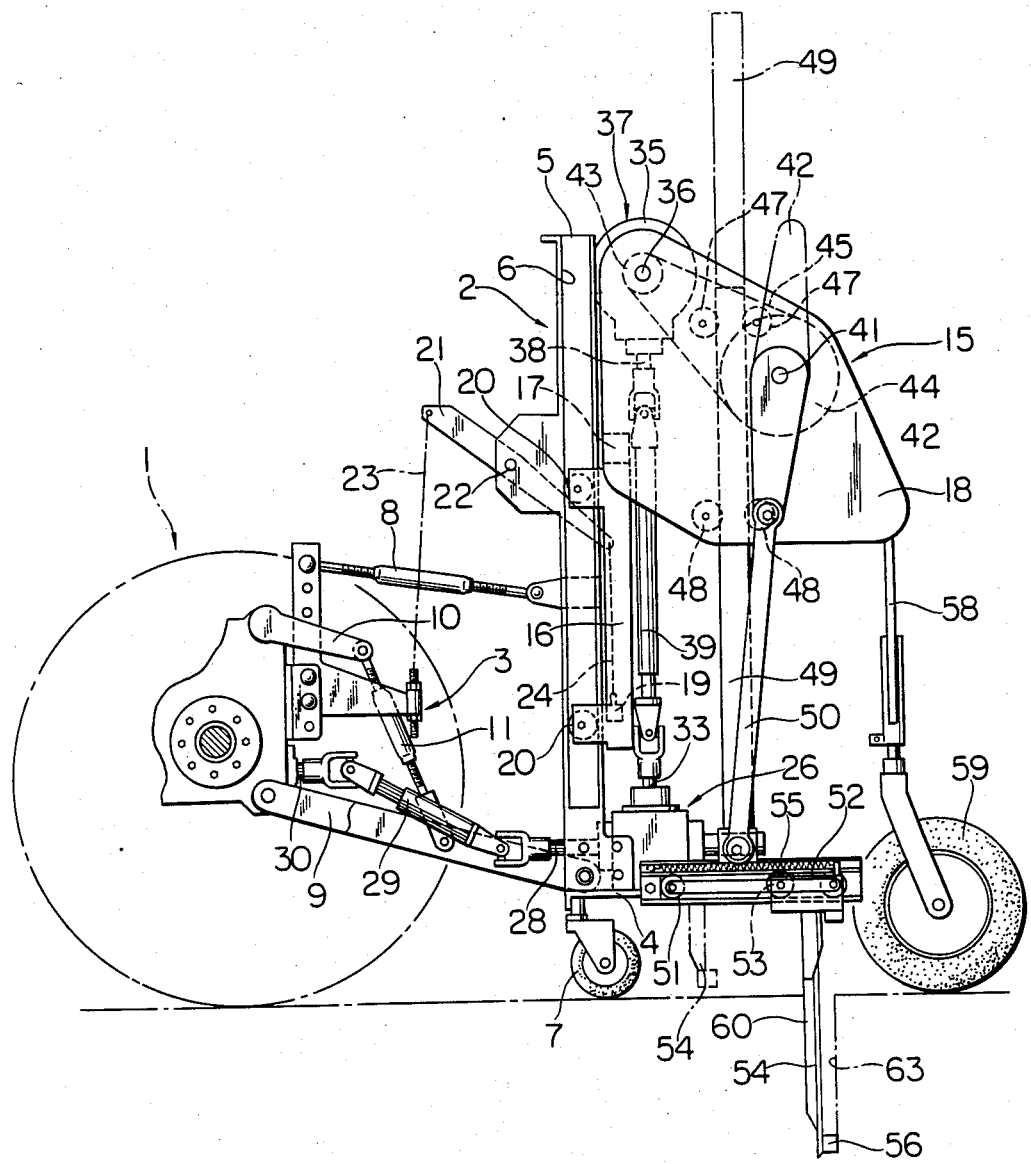
FIG. 2 is an enlarged elevational view of the driller for use in rice field illustrated in FIG. 1.
Figure 3:
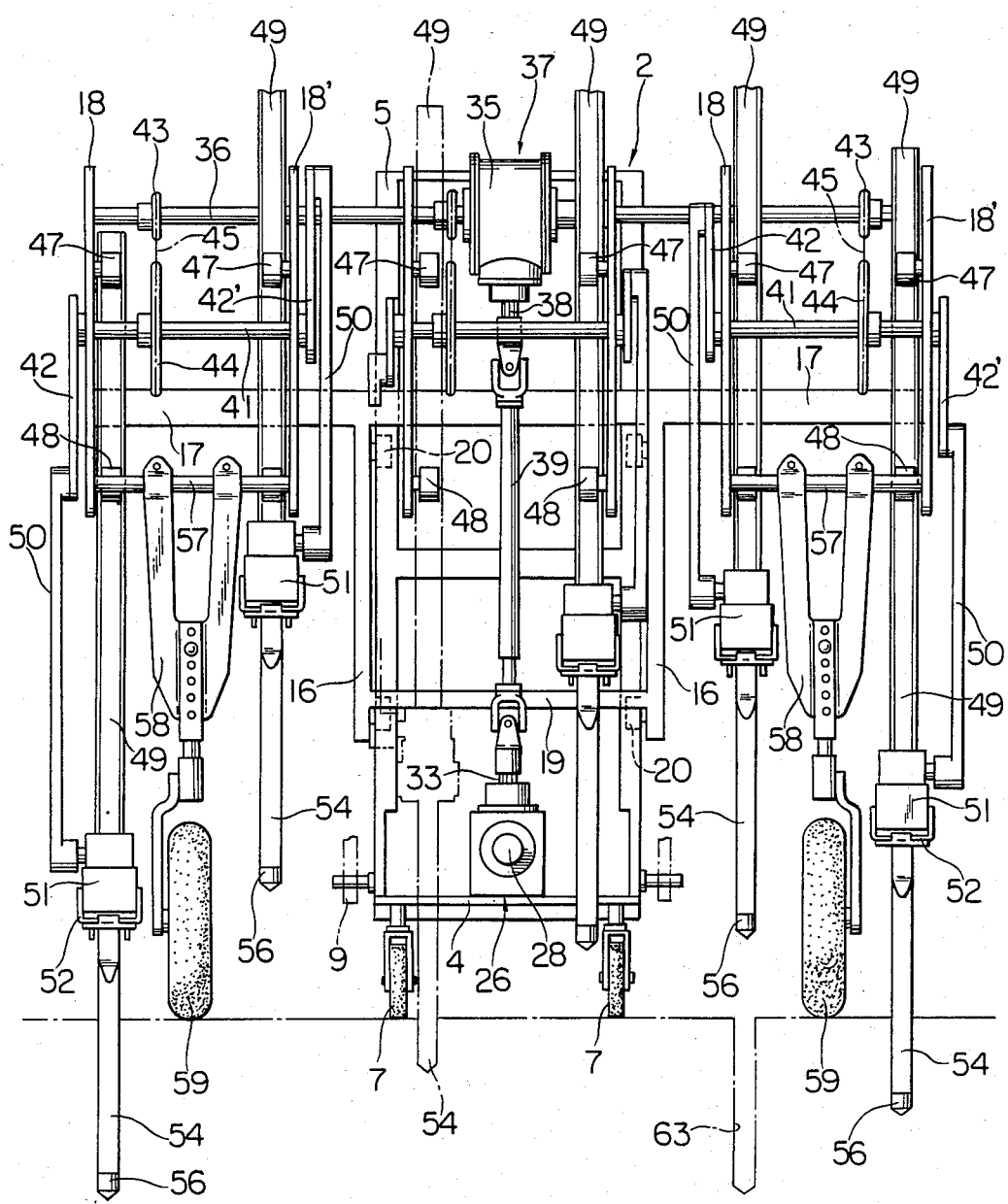
FIG. 3 is a partially cutaway right side view of the driller illustrated in FIG. 2.
Figure 4:
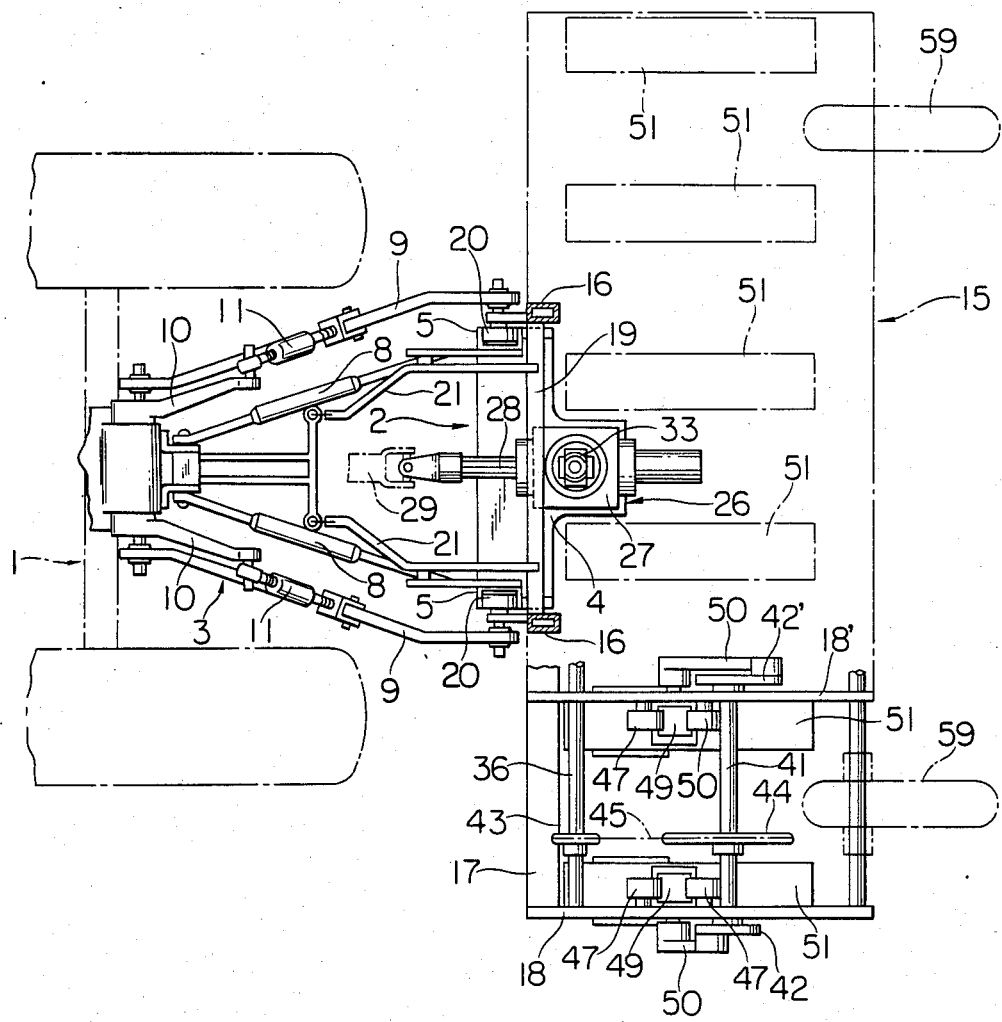
FIG. 4 is a partially cutaway elevational view of the driller illustrated in FIG. 2.

When the drilling operation is thus finished, the swing arm 10 is oscillated counterclockwise in FIG. 2 by means of the hydraulic motor of the tractor, and the lower link 9 is likewise turned counterclockwise through the intermediate link 11. By this turning, the pivot pin 22 of the guide frame 2 is lifted up so that the supporting frame 15 is lifted up through the lower beam 19 by the action of the chain 24 in such a manner that the roller 20 of the supporting frame 15 rolls in the groove of the guide post 5 and thus the rod 39 extends.

With this lifting up, the drilling rods 54 are lifted up to the locations which are assuredly free from contact with the earth surface. In this instance, if the ratio in length from the pivot pin 22 of the swing lever 21 to its end on the side of chains 24, 23 be increased, the supporting frame 15 may be lifted up largely by oscillating the swing arm 10 in a small amount.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A driller for use on a tractor in a rice field comprising,
   a frame connected to the tractor,
   a vertically moving rod,
   guide rollers mounted on the frame supporting the rod for vertical movement but preventing horizontal movement of the rod,
   a vertical moving mechanism connected to the frame and connected to and driven by a drive source on the tractor and connected to and vertically moving the rod,
   a horizontally extending guide connected to the lower end of the vertically moving rod,
   a support means movably supported from and horizontally movable along said guide rod,
   drilling means connected perpendicularly to the support means for drilling holes in the ground as the vertically moving rod is moved upwardly and downwardly, said drilling means includes a drill rod having a cylindrical drilling piece adjacent the lower end, and
   biasing means connected to the horizontally movable support for biasing the horizontally movable means towards the tractor when the drilling means is disengaged from the ground.

* * * * *